(12) United States Patent
Yang et al.

(10) Patent No.: US 8,300,927 B2
(45) Date of Patent: Oct. 30, 2012

(54) MOUTH REMOVAL METHOD FOR RED-EYE DETECTION AND CORRECTION

(75) Inventors: Susan Yang, Toronto (CA); Jie Wang, Toronto (CA)

(73) Assignee: Seiko Epson Corporation, Tokyo (JP)

( * ) Notice: Subject to any disclaimer, the term of this patent is extended or adjusted under 35 U.S.C. 154(b) by 417 days.

(21) Appl. No.: 12/704,314

(22) Filed: Feb. 11, 2010

(65) Prior Publication Data

US 2011/0194759 A1 Aug. 11, 2011

(51) Int. Cl.
*G06K 9/34* (2006.01)
*G06K 9/40* (2006.01)
*G06K 9/00* (2006.01)

(52) U.S. Cl. ............ 382/164; 382/167; 382/275

(58) Field of Classification Search .......... 382/117–118, 382/159, 162.164, 165, 167, 173, 190, 199, 382/254, 260–266, 275; 348/207, 222.1, 348/223.1, 224.1, 225.1, 239, 241, 370, 576; 358/3.26, 515, 518, 522; 345/589, 591
See application file for complete search history.

(56) References Cited

U.S. PATENT DOCUMENTS

| | | | | |
|---|---|---|---|---|
| 6,873,743 | B2 * | 3/2005 | Steinberg | 382/275 |
| 6,980,691 | B2 * | 12/2005 | Nesterov et al. | 382/165 |
| 7,035,461 | B2 * | 4/2006 | Luo et al. | 382/167 |
| 7,116,820 | B2 | 10/2006 | Luo et al. | |
| 7,403,654 | B2 * | 7/2008 | Wu et al. | 382/167 |
| 8,036,460 | B2 * | 10/2011 | Nanu et al. | 382/167 |
| 2004/0114829 | A1 * | 6/2004 | LeFeuvre et al. | 382/275 |
| 2005/0207648 | A1 | 9/2005 | Iguchi et al. | |
| 2006/0029263 | A1 | 2/2006 | Zhang | |
| 2006/0257132 | A1 | 11/2006 | Shiffer et al. | |
| 2009/0220148 | A1 * | 9/2009 | Levy et al. | 382/163 |
| 2010/0172584 | A1 * | 7/2010 | Lukac et al. | 382/167 |
| 2011/0080616 | A1 * | 4/2011 | Yang et al. | 358/3.26 |
| 2011/0194759 | A1 * | 8/2011 | Yang et al. | 382/164 |

FOREIGN PATENT DOCUMENTS

| | | |
|---|---|---|
| EP | 1970859 A1 | 9/2008 |
| GB | 2432659 | 5/2007 |

\* cited by examiner

*Primary Examiner* — Amir Alavi (57) ABSTRACT

An input image (e.g. a digital RGB color image) is subjected to an eye classifier that is targeted at discriminating a complete eye pattern from any non-eye patterns. The red-eye candidate list with associated bounding boxes that are generated by the red-eye classifier are received. The bounding rectangles are subjected to object segmentation. A connected component labeling procedure is then applied to obtain one or more red regions. The largest red region is then chosen for feature extraction. A number of features are then extracted from this region. Then these features are used to determine if the particular candidate red-eye object is a mouth.

20 Claims, 7 Drawing Sheets

(a) Whole eye        (b) Partial eye

(a) Whole mouth  (b) Partial mouth

MOUTH REMOVAL METHOD FOR RED-EYE DETECTION AND CORRECTION

BACKGROUND

Field of Invention

Red-eye detection and correction technologies are used in printers, digital cameras, and image editing software to localize and correct the red-eye effects in digital photographs captured using a flash. Though there has been a great deal of progress in red-eye detection and correction in the last few years, many problems remain unsolved. Research in these areas must confront many challenging problems, especially when dealing with varying illumination, low image quality and resolution, eye size and variations in face orientation, and background changes in complex scenes.

In general, early stages of a red-eye detection involve distinguishing between true red-eye objects and a number of incorrectly detected non-red-eye objects (referred to as false positives or falses), which are particularly evident in complex scenes. This false detection processing can be reduced based on the evaluation of the object's color, structural and geometric characteristics, as disclosed in commonly assigned U.S. patent application Ser. No. 12/349,911, filed Jan. 7, 2009, and entitled "Method of detecting red-eye objects in digital images using color, structural, and geometric characteristics," which application is hereby expressly incorporated herein by reference in its entirety. False detection processing can also be reduced based on luminance-chrominance characteristics, contrast characteristics, region smoothness characteristics, binary pattern characteristics and glasses frame characteristics, as disclosed in commonly assigned U.S. patent application Ser. No. 12/575,321, filed Oct. 7, 2009, and entitled "Automatic red-eye object classification in digital photographic images," which application is hereby expressly incorporated herein by reference in its entirety. False detection processing can be reduced further based on some trained classifier such as boosting-based framework, as disclosed in commonly assigned U.S. patent application Ser. No. 12/575,298, filed Oct. 7, 2009, and entitled "Automatic red-eye object classification in digital images using a boosting-based framework," which application is hereby expressly incorporated herein by reference in its entirety.

Although these techniques can significantly suppress false detections, some false positives still remain, in particular mouth patterns. This is due to the fact that mouth patterns usually exhibit similar color and structural characteristics as that of true red-eye objects. Correction of the mouth area as a falsely detected red-eye object will ruin the picture and disappoint the end user. Therefore, suppressing mouth (false red-eye) detections becomes a critical factor in ensuring a successful application in real world products.

SUMMARY OF INVENTION

An object of the present invention is to remove mouth detections (false positives) as red-eye candidates while preserving high-computational speed and eye detection rate.

The present invention assumes that an input image (e.g. a digital RGB color image) has been subjected to an eye classifier that is targeted at discriminating a complete eye pattern from any non-eye patterns. The present invention starts with the red-eye candidate list with associated bounding boxes that are generated by the red-eye classifier.

The bounding rectangles are subjected to object segmentation. As is known, segmentation, generally, is the process of grouping together into a single entity (object) pixels that have something in common. In the present invention, the purpose of object segmentation is to group or segment out red regions (mouth or red retina).

A connected component labeling procedure is then applied to obtain one or more red regions. The largest red region denoted as "newFeaObj" is then chosen for feature extraction.

A number of features are then extracted from this region. These include: feature $k_w$, defined as the ratio between a width of the segmented red region and a width of the bounding rectangle; feature $k_h$, defined as the ratio between a height of the segmented red region and a height of the bounding rectangle; feature s, defined as the ratio between the width and height of the segmented red region; feature v, defined as a decision score from the eye classifier; and feature m, defined as a geometrical relationship between the particular candidate red-eye object and others of the plurality of candidate red-eye objects.

The present invention then uses these features $k_w$, $k_h$, s, v, and m to determine if the particular candidate red-eye object is a mouth.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

DESCRIPTION OF THE PREFERRED EMBODIMENTS

In the following detailed description, reference is made to the accompanying drawings that show, by way of illustration, example embodiments of the invention. In the drawings, like numerals describe substantially similar components throughout the several views. These embodiments are described in sufficient detail to enable those skilled in the art to practice the invention. Other embodiments may be utilized and structural, logical and electrical changes may be made without departing from the scope of the present invention. Moreover, it is to be understood that the various embodiments of the invention, although different, are not necessarily mutually exclusive.

For example, a particular feature, structure, or characteristic described in one embodiment may be included within other embodiments. The following detailed description is, therefore, not to be taken in a limiting sense, and the scope of the present invention is defined only by the appended claims, along with the full scope of equivalents to which such claims are entitled.

In general, example embodiments relate to methods, devices, and computer-readable media for detecting red-eye objects in images. Example embodiments can be used in conjunction with red-eye correction applications to produce images in which red-eye objects are detected and modified to remove or minimize the red-eye effect. Consequently, image quality may be enhanced automatically with little or no user manipulation of the image.

Example embodiments detect a red-eye effect in images by evaluating whether or not a red-eye candidate object is a mouth or not. Methods consistent with the invention may be implemented in image capture devices such as scanners or digital cameras, as well as in software modules including printer drivers or image editing software, among other things.

Figure 1:
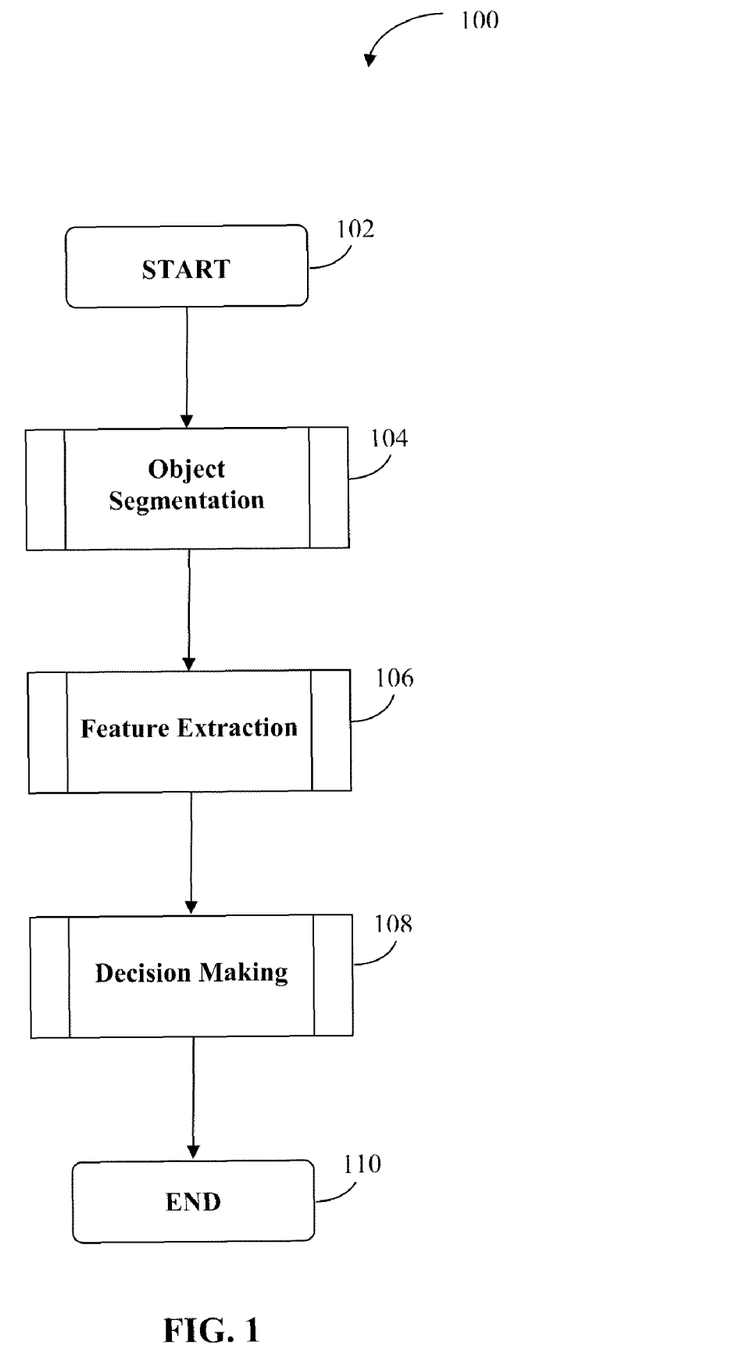
FIG. 1 is a flowchart of the general method of the present invention.

With reference now to FIG. 1, an example method 100 for red-eye detection is disclosed. More particularly, the example method 100 identifies objects in the image and determines whether the objects are candidate red-eye objects. Each candidate red-eye object may then be eliminated or retained as a candidate by deciding whether or not the candidate object is a mouth pattern or not.

The example method 100 and variations thereof disclosed herein can be implemented using computer-readable media for carrying or having computer-executable instructions or data structures stored thereon. Such computer-readable media can be any available media that can be accessed by a processor of a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store program code in the form of computer-executable instructions or data structures and which can be accessed by a processor of a general purpose or special purpose computer. Combinations of the above should also be included within the scope of computer-readable media.

Computer-executable instructions comprise, for example, instructions and data which cause a processor of a general purpose computer or a special purpose computer to perform a certain function or group of functions. Although the subject matter is described herein in language specific to methodological acts, it is to be understood that the subject matter defined in the appended claims is not necessarily limited to the specific acts described herein. Rather, the specific acts described herein are disclosed as example forms of implementing the claims.

Examples of special purpose computers include image processing devices such as digital cameras (an example of which includes, but is not limited to, the Epson R-D1 digital camera manufactured by Seiko Epson Corporation headquartered in Owa, Suwa, Nagano, Japan), digital camcorders, projectors, printers, scanners, copiers, portable photo viewers (examples of which include, but are not limited to, the Epson P-3000 or P-5000 portable photo viewers manufactured by Seiko Epson Corporation), or portable movie players, or some combination thereof, such as a printer/scanner/copier combination (examples of which include, but are not limited to, the Epson Stylus Photo RX580, RX595, or RX680, the Epson Stylus CX4400, CX7400, CX8400, or CX9400Fax, and the Epson AcuLaser® CX11NF manufactured by Seiko Epson Corporation) or a printer/scanner combination (examples of which include, but are not limited to, the Epson TM-J9000, TM-J9100, TM-J7000, TM-J7100, and TM-H6000III, all manufactured by Seiko Epson Corporation) or a digital camera/camcorder combination. An image processing device may include a red-eye detection capability, for example, to detect red-eye effects in an image. For example, an image capture device, such as a camera or scanner, with this red-eye detection capability may include one or more computer-readable media that implement the example method 100. Alternatively, a computer connected to the image capture device may include one or more computer-readable media that implement the example method 100.

Figure 2:
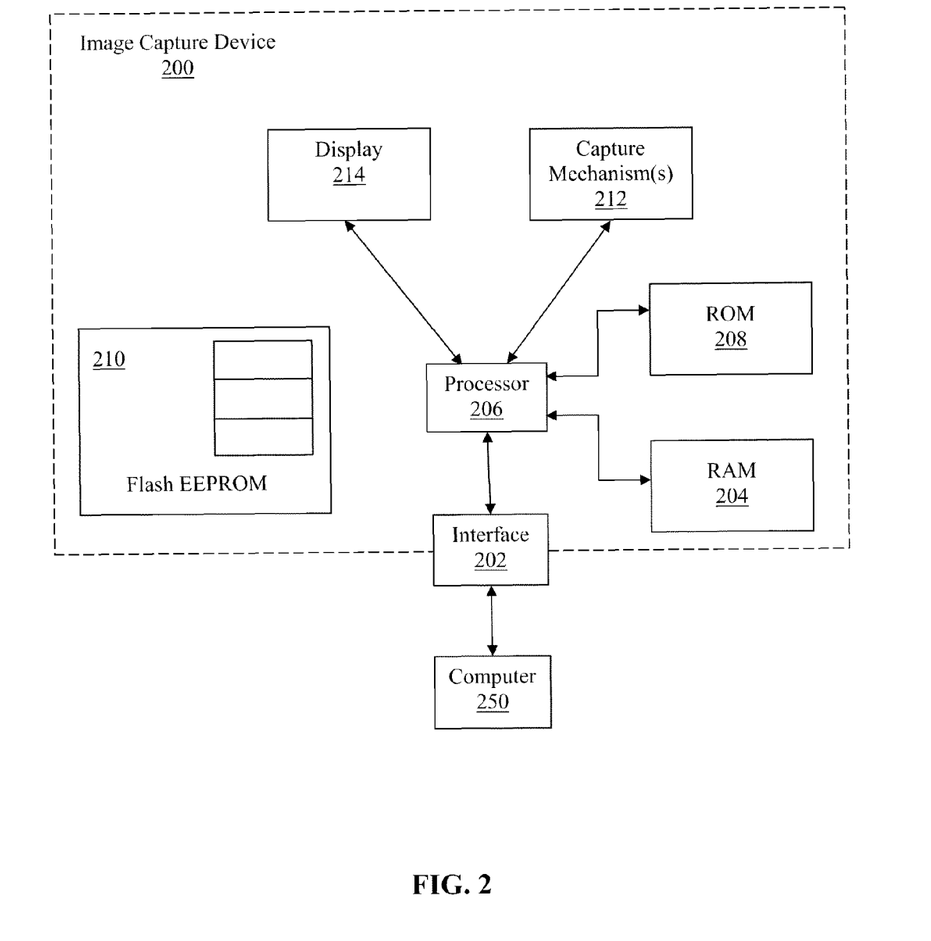
FIG. 2 is a general block diagram of an image capture device and system for utilizing the present invention.

A schematic representation of an example image capture device 200 is disclosed in FIG. 2. The example image capture device 200 exchanges data with a host computer 250 by way of an intervening interface 202. Application programs and an image capture device driver may also be stored for access on the host computer 250. When an image retrieve command is received from the application program, for example, the image capture device driver controls conversion of the command data to a format suitable for the image capture device 200 and sends the converted command data to the image capture device 200. The driver also receives and interprets various signals and data from the image capture device 200, and provides necessary information to the user by way of the host computer 250.

When data is sent by the host computer 250, the interface 202 receives the data and stores it in a receive buffer forming part of a RAM 204. The RAM 204 can be divided into a number of sections, for example through addressing, and allocated as different buffers, such as a receive buffer or a send buffer. Data, such as digital image data, can also be obtained by the image capture device 200 from the capture mechanism(s) 212, the flash EEPROM 210, or the ROM 208. For example, the capture mechanism(s) 212 can generate a digital photographic image. This digital image can then be stored in the receive buffer or the send buffer of the RAM 204.

A processor 206 uses computer-executable instructions stored on a ROM 208 or on a flash EEPROM 210, for example, to perform a certain function or group of functions, such as the method 100 for example. Where the data in the receive buffer of the RAM 204 is a digital image, for example, the processor 206 can implement the methodological acts of the method 100 on the digital image to detect red-eye objects in the digital image and thereby remove or minimize red-eye effects. Further processing in an imaging pipeline may then be performed on the digital image before the image is displayed by the image capture device 200 on a display 214, such as an LCD display for example, or transferred to the host computer 250, for example.

The example method 100 for detecting red-eye effects in an image will now be discussed in connection with FIG. 1. Prior to performing method 100, an input image can be targeted for various image processing operations including red-eye detection. The targeted input image may be a digital color image or a digitized or scanned version of a color image. Various image processing techniques may be applied to the targeted input image before method 100 is performed.

The present invention assumes that an input image (e.g. a digital RGB color image) has been subjected to an eye classifier that is targeted at discriminating a complete eye pattern from any non-eye patterns. An example of such classifier is the boosting based classifier disclosed in commonly assigned U.S. patent application Ser. No. 12/575,298, filed Oct. 7, 2009, and entitled "Automatic red-eye object classification in digital images using a boosting-based framework," which application is hereby expressly incorporated herein by reference in its entirety. The present invention is not limited to or concerned with any particular eye classifier and any known classifier such as those based on an AdaBoost algorithm may be used to generate the red eye candidate list and their associated bounding boxes. Other examples include, but are not limited to, support vector machines, neural networks and other training or non-training based classifiers. The output of such classifier is usually a rectangular bounding box which is intended to include a complete eye region, but may indeed include a bounding box of a mouth region.

Figure 3:
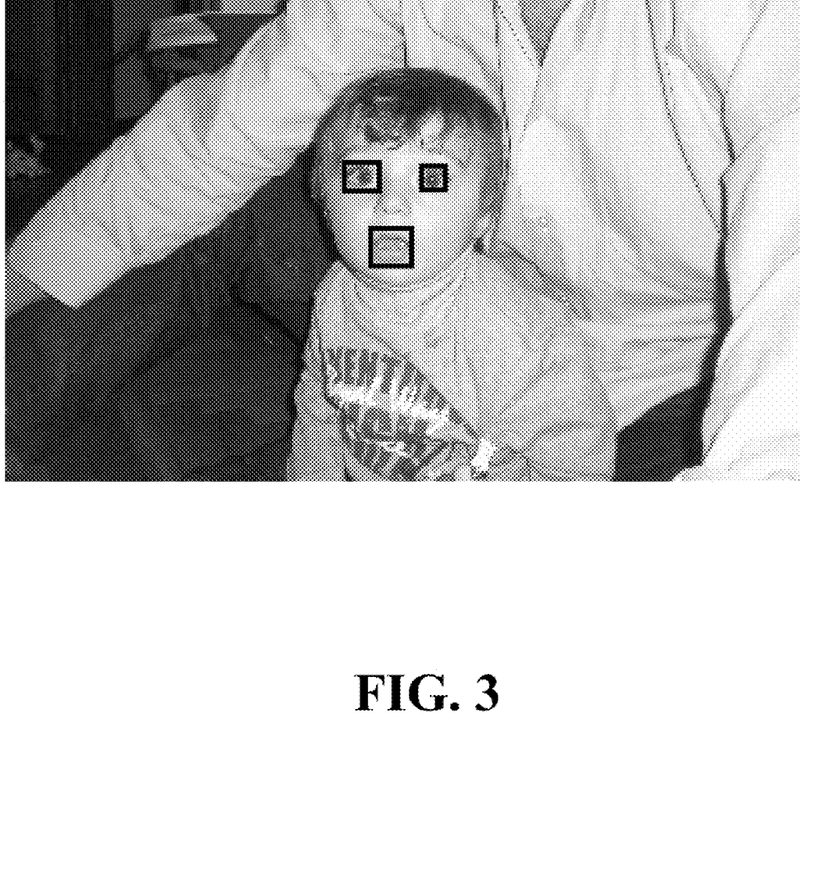
FIG. 3 is an example of a captured image in RGB color space and the bounding boxes output by a typical red-eye classifier.

The present invention starts (START, step 102) with the red-eye candidate list with associated bounding boxes that are generated by the red-eye classifier. FIG. 3 illustrates a typical example of an input image that has been subjected to a red-eye classifier with the result being 3 candidate objects (two true red-eye objects and one mouth, false positive, object) being output from the classifier. The rectangles shown in FIG. 3 represent the bounding boxes output by the red-eye classifier. Based on the observation that in the detected region (bounded by the rectangular bounding box), the true red-eye pattern usually contains only a relatively few red pixels due to the fact the eye ball region occupies a small part of a complete eye. However, for a mouth pattern, the red area usually occupies a relatively large part of the bounding box. Therefore, the ratio between the bounding box size and red part size can be an effective indicator to help discriminate between an eye pattern and a mouth pattern. This distinction between true red-eye candidates and false mouth pattern candidates is used in the present invention to exclude mouth patterns.

In the present invention, the bounding rectangles, for example those shown in FIG. 3, are subjected to object segmentation (FIG. 1, step 104). As is known, segmentation, generally, is the process of grouping together into a single entity (object) pixels that have something in common. In the present invention, the purpose of object segmentation is to group or segment out red regions (mouth or red retina). In these groups, features are extracted or calculated as will be described later herein.

Figure 4:
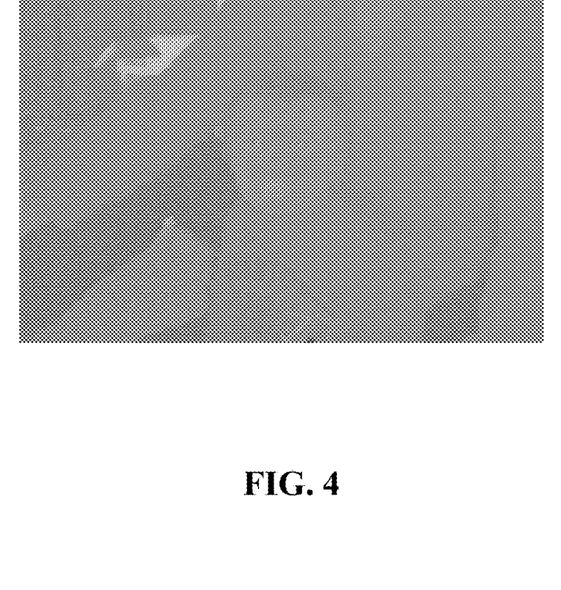
FIG. 4 shows the image of FIG. 3 in normalized LAB color space.
Figure 5:
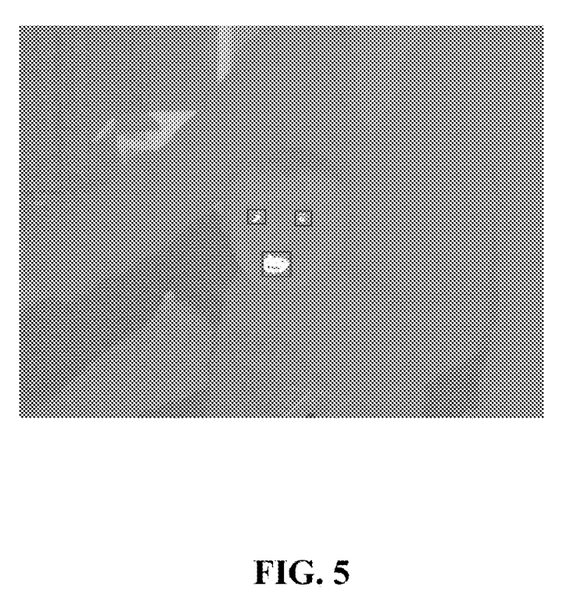
FIG. 5 illustrates the results of segmentation of the image of FIG. 3 in LAB color space.

Object segmentation is used in the present invention to detect red pixels and regions. The normalized LAB space is proved to be effective for segmenting out mouth-like patterns. As is well known, a LAB color space is a color-opponent space with dimension L measuring lightness, and A and B representing color-opponent dimensions. FIG. 4 depicts the normalized LAB image of FIG. 3. In this depiction the whole image is transformed into LAB space for illustration purposes. However, in the actual implementation only pixels in the bounding rectangles are needed to be transformed into LAB space. The values of L, A, and B are first normalized to [0, 1] and then mapped into [0, 255]. It is observed from experiments that in most cases, for a mouth object, values of A and (A−B) of the red pixels are normally larger than those of other pixels. Therefore, each pixel (located at coordinate (x, y)) inside the candidate bounding rectangle can be determined as a red pixel or not according to its A and (A-B) values as follows, $$b(x, y) = \begin{cases} 1 & \text{if } A_{(x,y)} > T_A \text{ and } (A_{(x,y)} - B_{(x,y)}) > T_{A\_B} \\ 0 & \text{otherwise} \end{cases}$$

where b(x,y)=1 denotes a red pixel at coordinate (x, y) and b(x,y)=0 denotes a non-red pixel at coordinate (x, y), $T_A$ and $T_{A\_B}$ are thresholds determined by an automatic threshold selection technique. In a preferred embodiment, Otsu's method is used. As is well known, Otsu's method automatically performs histogram shape-based image thresholding, or, the reduction of a graylevel image to a binary image. A connected component labeling procedure is then applied to obtain one or more red regions. The largest red region denoted as "newFeaObj" is then chosen for feature extraction, discussed later herein. FIG. 5 depicts the segmentation results for each candidate object in FIG. 3, with the largest red region being the mouth pattern.

Due to the complex illumination variations, segmentation in a single color space can not always guarantee optimum results. Therefore, segmentation in different color spaces is also applied. The features described later will be calculated in LAB space and some other color spaces. Features extracted from different color spaces are then combined and utilized in the decision making step 108, described later, to give a more reliable result. In one embodiment, similar segmentation is applied in the RGB (red, green, blue) color space to identify red pixels in the bounding rectangle of each candidate object.

The present invention is not limited to, or particularly concerned with any particular segmentation method, thresholding method, or color space. Although Otsu's method is applied in the LAB and RGB color spaces in one exemplary implementation, any type of segmentation technology, redness measurement and color spaces may be utilized as long as the mouth like red pixels can be extracted.

The next step in method 100 is feature extraction (step 106). Before detailing this step, we will first discuss the various features that are of interest in the present invention.

Feature $k_w$

First, we consider a horizontal scenario where the left eye and right eye are horizontally aligned.

Figure 6:
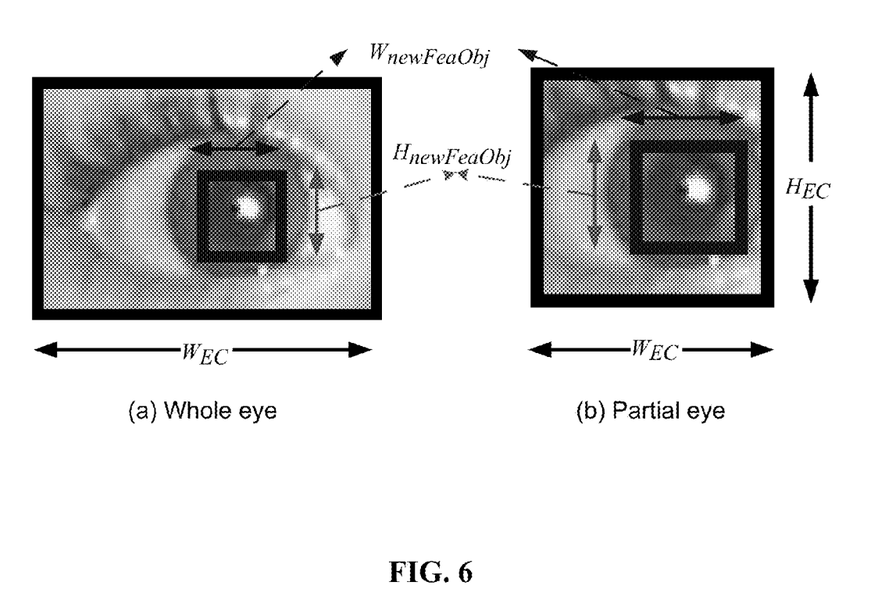
FIG. 6 illustrates the bounding box of eye candidates output by a typical red-eye classifier, with (a) showing a whole eye, and (b) showing a partial eye.

FIG. 6 depicts a typical example of an eye pattern and its corresponding bounding box (large, exterior rectangle in the figure) output by an eye classifier. FIG. 6 (a) demonstrates a perfect detection scenario and (b) demonstrates a partial detection scenario, which is due to the imperfectness of the eye classifier. It has been observed that although some partial detection exists in many eye classification methods, the output bounding box of an eye candidate is usually much larger than red retina region, which is bounded by the smaller, interior rectangle in the figure.

Figure 7:
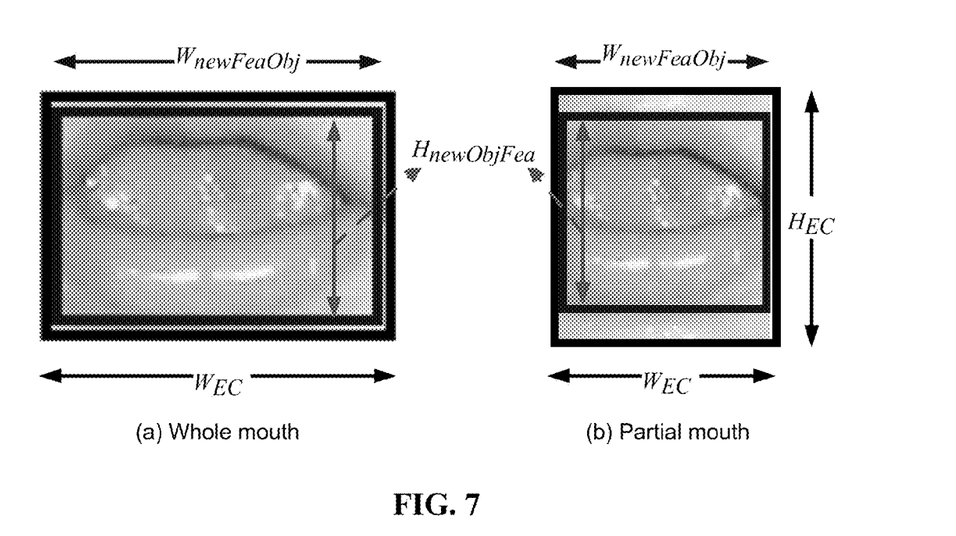
FIG. 7 illustrates the bounding box of mouth pattern candidates output by a typical red-eye classifier, with (a) showing a whole mouth, and (b) showing a partial mouth.

FIG. 7 depicts a typical example of a mouth pattern and its corresponding bounding box (exterior rectangle in the figure) output by an eye classifier. It has been observed that the red region (bounded by the smaller, interior rectangle in the figure) occupies a larger portion of the object bounding box in both perfect (a) and partial (b) detection cases.

Therefore, the first feature $k_w$ is defined as follows:

$$k_w = W_{newFeaObj}/W_{EC},$$

where $W_{newFeaObj}$ denotes the width of the red region, which was segmented out of the image in step 104 (FIG. 1) discussed above, and $W_{EC}$ denotes the width of the bounding box output by an eye classifier. In most cases, the $k_w$ value of a mouth pattern is larger than that of an eye pattern.

Feature $k_h$

Feature $k_w$ is effective for horizontal eye/mouth classification as shown in FIGS. 6 and 7. For vertical cases where the two eyes of one person are vertically aligned, feature $k_h$ is proposed as follows:

$$k_h = H_{newFeaObj}/H_{EC},$$

where $H_{newFeaObj}$ denotes the height of the red region, which was segmented out of the image in step 104 (FIG. 1) discussed above, and $H_{EC}$ denotes the height of the bounding box output by an eye classifier. Similarly, in most cases, the $k_h$ value of a vertical mouth pattern is larger than that of a vertical eye pattern.

Feature s

Feature s is defined as the ratio between $W_{newFeaObj}$ and $H_{newFeaObj}$ as follows, $$s = W_{newFeaObj}/H_{newFeaObj}$$

Feature v

Feature v is defined as the decision score output by an eye classifier. It can be similarity score, confidence level or vote. In one embodiment, v denotes the vote of a boosting based classifier. The present invention is not limited to or concerned with any particular eye classifier. However, AdaBoost is a good, commonly known and commonly used method that constructs a classifier in an incremental fashion by adding simple classifiers to a pool and using their weighted vote to determine their final classification.

Feature m

Figure 8:
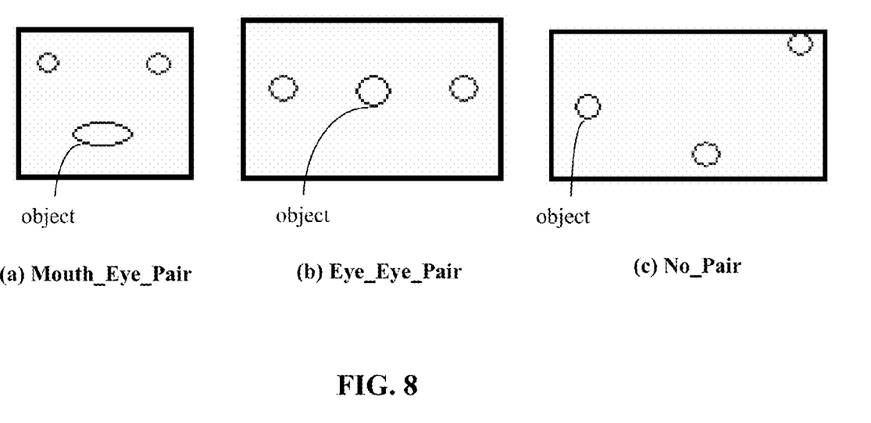
FIG. 8 illustrates the geometrical relationship between objects in an image with (a), (b), and (c) showing three different resultant labels for feature m used in the present invention.

Feature m captures the geometric relationship between objects in a given image. FIG. 8 shows three cases of feature m, assuming a horizontal mouth (as shown in FIG. 7) is considered. In FIG. 8, "object" represents the candidate object (to be determined as a mouth or not) and the other circles represent other objects in the given image. In case (a), if 1 or 2 objects are found in the top side region within a predetermined distance of the candidate object, feature m of the candidate object is flagged as "Mouth_Eye_Pair". In case (b), m of the candidate object is flagged as 'Eye_Eye_Pair" if there is one object found in its left or right side region within a predetermined distance. In other cases, m is flagged as "No_Pair". FIG. 3 (c) illustrates an example where m is flagged as "No_Pair". The "predetermined distances" referenced above must be determined empirically for a particular device, for example by taking test photos of faces with a device, subjecting them to an eye classifier and determining typical distances between candidate red-eye objects that correspond to the actual eyes and mouth of the test photos.

For vertical cases, feature m can be determined in a similar way.

Now that we have outlined the features of interest in the present invention, we will discuss how these features are used in the decision making step, which is step 108 in FIG. 1.

To determine if a candidate object is a mouth pattern or not, the present invention employs a decision making mechanism using the obtained 8 features $k^{LAB}_w$, $k^{LAB}_h$, $s^{LAB}$, $k^{RGB}_w$, $k^{RGB}_h$, $s^{RGB}$, v and m.

Each candidate object's features are extracted as described above, and for a particular candidate, if its feature $k^{LAB}_w > k^{LAB}_h$ or $k^{RGB}_w > k^{RGB}_h$ and at the same time $k^{LAB}_w$ is larger than a threshold $t_{kw}$, a horizontal mouth scenario is assumed for that particular candidate and m is determined based on the horizontal case as described above.

The decision as to whether or not the particular candidate object is a mouth can then be made by examining if all other features are satisfied with some pre-defined thresholds in a horizontal mouth scenario. In one embodiment, the decision logic can be as follows: the candidate object is determined as a mouth pattern if m is not flagged as "Eye_Eye_Pair" and $s^{LAB}$ is larger than a threshold $t_s$, where $tk_{kw}=0.7$ and $t_s=0.79$.

For each candidate object, if its feature $k^{LAB}_h > k^{LAB}_w$ or $k^{RGB}_h > k^{RGB}_w$ and at the same time $k^{LAB}_h$ is larger than a threshold $t_{kh}$, a vertical mouth scenario is assumed and m is calculated based on the vertical case. In a similar way, the decision as to whether or not the candidate is a mouth can then be made by examining if all other features are satisfied with some pre-defined thresholds in a vertical mouth scenario. In one embodiment, the decision logic can be as follows: the candidate object is determined as a mouth pattern if v is larger than a threshold $t_v$ and $Max(W^{LAB}_{newFeaObj}, H^{LAB}_{newFeaObj})$ is larger than a threshold $t_{hw}$, where $t_{kh}=0.6$, $t_v=6$, $t_{hw}=6$, and $Max(W^{LAB}_{newFeaObj}, H^{LAB}_{newFeaObj})$ represents the larger value of $W^{LAB}_{newFeaObj}$ and $H^{LAB}_{newFeaObj}$.

If a red-eye candidate is determined to be a mouth pattern then it is excluded from further processing, i.e. excluded from red-eye correction. Thus, the present invention enhances red-eye correction mechanism currently used by identifying and excluding certain "false positives," particularly mouth patterns from red-eye correction. This enhances the overall result and provides an improved corrected image to the user.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A method for determining if a candidate for red-eye removal processing is a mouth, comprising:
   receiving from an eye classifier a plurality of candidate red-eye objects, each of the candidate red-eye objects contained within a bounding rectangle;
   for each particular candidate red-eye object:
     segmenting the candidate red-eye object to obtain a segmented red region within the candidate red-eye object's bounding rectangle;
     extracting a feature $k_w$, defined as the ratio between a width of the segmented red region and a width of the bounding rectangle;
     extracting a feature $k_h$, defined as the ratio between a height of the segmented red region and a height of the bounding rectangle;
     extracting a feature s, defined as the ratio between the width and height of the segmented red region;
     extracting a feature v, defined as a decision score from the eye classifier;
     extracting a feature m, defined as a geometrical relationship between the particular candidate red-eye object and others of the plurality of candidate red-eye objects; and
     using the features $k_w$, $k_h$, s, v, and m to determine if the particular candidate red-eye object is a mouth.

2. The method as recited in claim 1, wherein extracting the feature m comprises determining the geometrical relationship between the particular candidate red-eye object and others of the plurality of candidate red-eye objects and flagging the feature m as Mouth_Eye_Pair if one or two of the other of the plurality of candidate red-eye objects are found in the top side region within a predetermined distance of the particular candidate red-eye object; flagging the feature m as Eye_Eye_Pair if one of the other of the plurality of candidate red-eye objects is found in a left or right side region within a predetermined distance of the particular candidate red-eye object; and flagging the feature m as No_Pair in all other cases.

3. The method as recited in claim 2, wherein using the features $k_w$, $k_h$, s, v, and m to determine if the particular candidate red-eye object is a mouth includes:
   comparing $k_w$ to $k_h$, and comparing $k_w$ to a threshold $t_{kw}$ and if $k_w > k_h$ and $k_w > t_{kw}$, then a horizontal mouth condition is decided for the particular candidate red-eye object and feature m is extracted based on a horizontal mouth condition.

4. The method as recited in claim 3 where m is extracted based on a horizontal mouth condition and wherein,
the particular candidate red-eye object is determined to be a mouth if m is not flagged as Eye_Eye_Pair and feature s is larger than a threshold $t_s$, where $t_{kw}=0.7$ and $t_s=0.79$.

5. The method as recited in claim 2, wherein using the features $k_w$, $k_h$, s, v, and m to determine if the particular candidate red-eye object is a mouth includes:
comparing $k_h$ to $k_w$, and comparing $k_h$ to a threshold $t_{kh}$ and if $k_h > k_w$ and $k_h > t_{kh}$, then a vertical condition is decided for the particular candidate red-eye object and feature m is extracted based on a vertical mouth condition.

6. The method as recited in claim 5 where m is extracted based on a vertical mouth condition and wherein,
the particular candidate red-eye object is determined to be a mouth if v is larger than a threshold $t_v$ and $\text{Max}(W^{LAB}_{newFeaObj}, H^{LAB}_{newFeaObj})$ is larger than a threshold $t_{hw}$, where $t_{kh}=0.6$, $t_v=6$, $t_{hw}=6$, and $\text{Max}(W^{LAB}_{newFeaObj}, H^{LAB}_{newFeaObj})$ represents the larger value of $W^{LAB}_{newFeaObj}$ and $H^{LAB}_{newFeaObj}$.

7. The method of claim 1, wherein segmenting the candidate red-eye comprises:
for pixels in the bounding rectangle received from the eye classifier, transforming the pixels from RGB color space to LAB color space;
calculating thresholds for A and (A−B), denoted as $T_A$ and $T_{A\_B}$ respectively, using an automatic threshold selection algorithm;
applying a binarization procedure by determining if each pixel inside the bounding rectangle received from the eye classifier is a red pixel or non-red pixel according to the following equation:

$$b(x, y) = \begin{cases} 1 & \text{if } A_{(x,y)} > T_A \text{ and } (A_{(x,y)} - B_{(x,y)}) > T_{A\_B} \\ 0 & \text{otherwise} \end{cases}$$

where b(x,y)=1 denotes a red pixel at coordinate (x, y) and b(x,y)=0 denotes a non-red pixel at coordinate (x, y), the binarization procedure resulting in a binary image.

8. The method of claim 7, further comprising applying a connected component labeling technique to the binary image to obtain one or more connected red regions, and labeling a red region with the largest size newFeaObj.

9. The method of claim 8, further comprising calculating the width $W_{newFeaObj}$ and height $H_{newFeaObj}$ of the red region newFeaObj.

10. The method of claim 7, wherein transforming the pixels from RGB color space to LAB color space comprises:
first converting the pixels from RGB color space to LAB color space; then normalizing the pixels in LAB space to [0, 1], and then mapping the normalized pixels into [0, 255].

11. One or more non-transitory computer-readable media having computer-readable instructions thereon, which, when executed by a processor, implement a method for determining if a candidate for red-eye removal processing is a mouth, comprising:
receiving from an eye classifier a plurality of candidate red-eye objects, each of the candidate red-eye objects contained within a bounding rectangle;
for each particular candidate red-eye object:
segmenting the candidate red-eye object to obtain a segmented red region within the candidate red-eye object's bounding rectangle;
extracting a feature $k_w$, defined as the ratio between a width of the segmented red region and a width of the bounding rectangle;
extracting a feature $k_h$, defined as the ratio between a height of the segmented red region and a height of the bounding rectangle;
extracting a feature s, defined as the ratio between the width and height of the segmented red region;
extracting a feature v, defined as a decision score from the eye classifier;
extracting a feature m, defined as a geometrical relationship between the particular candidate red-eye object and others of the plurality of candidate red-eye objects; and
using the features $k_w$, $k_h$, s, v, and m to determine if the particular candidate red-eye object is a mouth.

12. The one or more non-transitory computer-readable media as recited in claim 11, wherein extracting the feature m comprises determining the geometrical relationship between the particular candidate red-eye object and others of the plurality of candidate red-eye objects and flagging the feature m as Mouth_Eye_Pair if one or two of the other of the plurality of candidate red-eye objects are found in the top side region within a predetermined distance of the particular candidate red-eye object; flagging the feature m as Eye_Eye_Pair if one of the other of the plurality of candidate red-eye objects is found in a left or right side region within a predetermined distance of the particular candidate red-eye object; and flagging the feature m as No_Pair in all other cases.

13. The one or more non-transitory computer-readable media as recited in claim 12, wherein using the features $k_w$, $k_h$, s, v, and m to determine if the particular candidate red-eye object is a mouth includes:
comparing $k_w$ to $k_h$, and comparing $k_w$ to a threshold $t_{kw}$ and if $k_w > k_h$ and $k_w > t_{kw}$, then a horizontal mouth condition is decided for the particular candidate red-eye object and feature m is extracted based on a horizontal mouth condition.

14. The one or more non-transitory computer-readable media as recited in claim 13 where m is extracted based on a horizontal mouth condition and wherein,
the particular candidate red-eye object is determined to be a mouth if m is not flagged as Eye_Eye_Pair and feature s is larger than a threshold $t_s$, where $t_{kw}=0.7$ and $t_s=0.79$.

15. The one or more non-transitory computer-readable media as recited in claim 12, wherein using the features $k_w$, $k_h$, s, v, and m to determine if the particular candidate red-eye object is a mouth includes:
comparing $k_h$ to $k_w$, and comparing $k_h$ to a threshold $t_{kh}$ and if $k_h > k_w$ and $k_h > t_{kh}$, then a vertical condition is decided for the particular candidate red-eye object and feature m is extracted based on a vertical mouth condition.

16. An image capture device for determining if a candidate for red-eye removal processing is a mouth, comprising:
a processor that:
receives from an eye classifier a plurality of candidate red-eye objects, each of the candidate red-eye objects contained within a bounding rectangle;
for each particular candidate red-eye object:
segments the candidate red-eye object to obtain a segmented red region within the candidate red-eye object's bounding rectangle;
extracts a feature $k_w$, defined as the ratio between a width of the segmented red region and a width of the bounding rectangle;

extracts a feature $k_h$, defined as the ratio between a height of the segmented red region and a height of the bounding rectangle;

extracts a feature s, defined as the ratio between the width and height of the segmented red region;

extracts a feature v, defined as a decision score from the eye classifier;

extracts a feature m, defined as a geometrical relationship between the particular candidate red-eye object and others of the plurality of candidate red-eye objects; and uses the features $k_w$, $k_h$, s, v, and m to determine if the particular candidate red-eye object is a mouth.

17. The image capture device as recited in claim 16, wherein extracting the feature m comprises determining the geometrical relationship between the particular candidate red-eye object and others of the plurality of candidate red-eye objects and flagging the feature m as Mouth_Eye_Pair if one or two of the other of the plurality of candidate red-eye objects are found in the top side region within a predetermined distance of the particular candidate red-eye object; flagging the feature m as Eye_Eye_Pair if one of the other of the plurality of candidate red-eye objects is found in a left or right side region within a predetermined distance of the particular candidate red-eye object; and flagging the feature m as No_Pair in all other cases.

18. The image capture device as recited in claim 17, wherein using the features $k_w$, $k_h$, s, v, and m to determine if the particular candidate red-eye object is a mouth includes:

comparing $k_w$ to $k_h$, and comparing $k_w$ to a threshold $t_{k_w}$ and if $k_w > k_h$ and $k_w > t_{k_w}$, then a horizontal mouth condition is decided for the particular candidate red-eye object and feature m is extracted based on a horizontal mouth condition.

19. The image capture device as recited in claim 18 where m is extracted based on a horizontal mouth condition and wherein, the particular candidate red-eye object is determined to be a mouth if m is not flagged as Eye_Eye_Pair and feature s is larger than a threshold $t_s$, where $t_{k_w}=0.7$ and $t_s=0.79$.

20. The image capture device as recited in claim 17, wherein using the features $k_w$, $k_h$, s, v, and m to determine if the particular candidate red-eye object is a mouth includes:

comparing $k_h$ to $k_w$, and comparing $k_h$ to a threshold $t_{k_h}$ and if $k_h > k_w$ and $k_h > t_{k_h}$, then a vertical condition is decided for the particular candidate red-eye object and feature m is extracted based on a vertical mouth condition.

\* \* \* \* \*